US010306959B2

(12) United States Patent
Rosedale

(10) Patent No.: US 10,306,959 B2
(45) Date of Patent: Jun. 4, 2019

(54) MOTORIZED SOLAR-TRACKING UMBRELLA BASE

(71) Applicant: August Rosedale, San Francisco, CA (US)

(72) Inventor: August Rosedale, San Francisco, CA (US)

( * ) Notice: Subject to any disclaimer, the term of this patent is extended or adjusted under 35 U.S.C. 154(b) by 134 days.

(21) Appl. No.: 15/697,317

(22) Filed: Sep. 6, 2017

(65) Prior Publication Data

US 2019/0069652 A1    Mar. 7, 2019

(51) Int. Cl.
*A45B 23/00* (2006.01)
*A45B 25/00* (2006.01)
*G05D 1/02* (2006.01)
*G05D 1/00* (2006.01)

(52) U.S. Cl.
CPC .............. *A45B 23/00* (2013.01); *A45B 25/00* (2013.01); *G05D 1/0016* (2013.01); *G05D 1/0276* (2013.01); *A45B 2023/0006* (2013.01); *A45B 2025/003* (2013.01)

(58) Field of Classification Search
CPC . A45B 23/00; A45B 25/00; A45B 2023/0006; A45B 2025/003; G05D 1/0016; G05D 1/0276
See application file for complete search history.

(56) References Cited

U.S. PATENT DOCUMENTS

| | | | | |
|---|---|---|---|---|
| 7,631,653 | B2* | 12/2009 | Young | A45B 17/00 135/15.1 |
| 8,061,374 | B2* | 11/2011 | Li | A45B 23/00 135/16 |
| 8,561,625 | B2* | 10/2013 | Chen | A45B 11/00 135/20.3 |
| 9,528,313 | B1* | 12/2016 | Arimilli | E04F 10/02 |
| 2015/0116485 | A1* | 4/2015 | Revankar | A45B 23/00 348/135 |
| 2017/0332750 | A1* | 11/2017 | Gharabegian | H04N 7/181 |
| 2018/0094448 | A1* | 4/2018 | Davis | E04H 15/06 |
| 2018/0332154 | A1* | 11/2018 | Gharabegian | H04M 1/21 |

\* cited by examiner

*Primary Examiner* — Todd M Melton
(74) *Attorney, Agent, or Firm* — Vierra Magen Marcus LLP

(57) ABSTRACT

A motorized, weighted base for outdoor patio umbrellas that can be controlled by a smartphone via Bluetooth, is solar powered to not need recharging, and moves the umbrella automatically to keep the user in the shade.

20 Claims, 2 Drawing Sheets

MOTORIZED SOLAR-TRACKING UMBRELLA BASE

BACKGROUND

The problem with patio umbrella bases that we have today are that they are either too heavy to easily move, or instead will blow over in the wind. People who buy these bases end up positioning themselves and their chairs in undesirable positions just to be in the shaded area of the umbrella instead of undertaking the moving or rolling of the heavy umbrella.

SUMMARY

A motorized, weighted base for outdoor patio umbrellas is proposed that can be controlled by a smartphone via Bluetooth, is solar powered to not need recharging, and moves the umbrella automatically to keep the user in the shade. This motorized, automated base will bring ease to the customer by allowing them to use their smartphone to position the umbrella where they would like it, and then automatically keep them shaded as the sun moves through the sky.

BRIEF DESCRIPTION OF THE DRAWINGS

Like-numbered elements refer to common components in the different figures.

DETAILED DESCRIPTION

Figure 1:
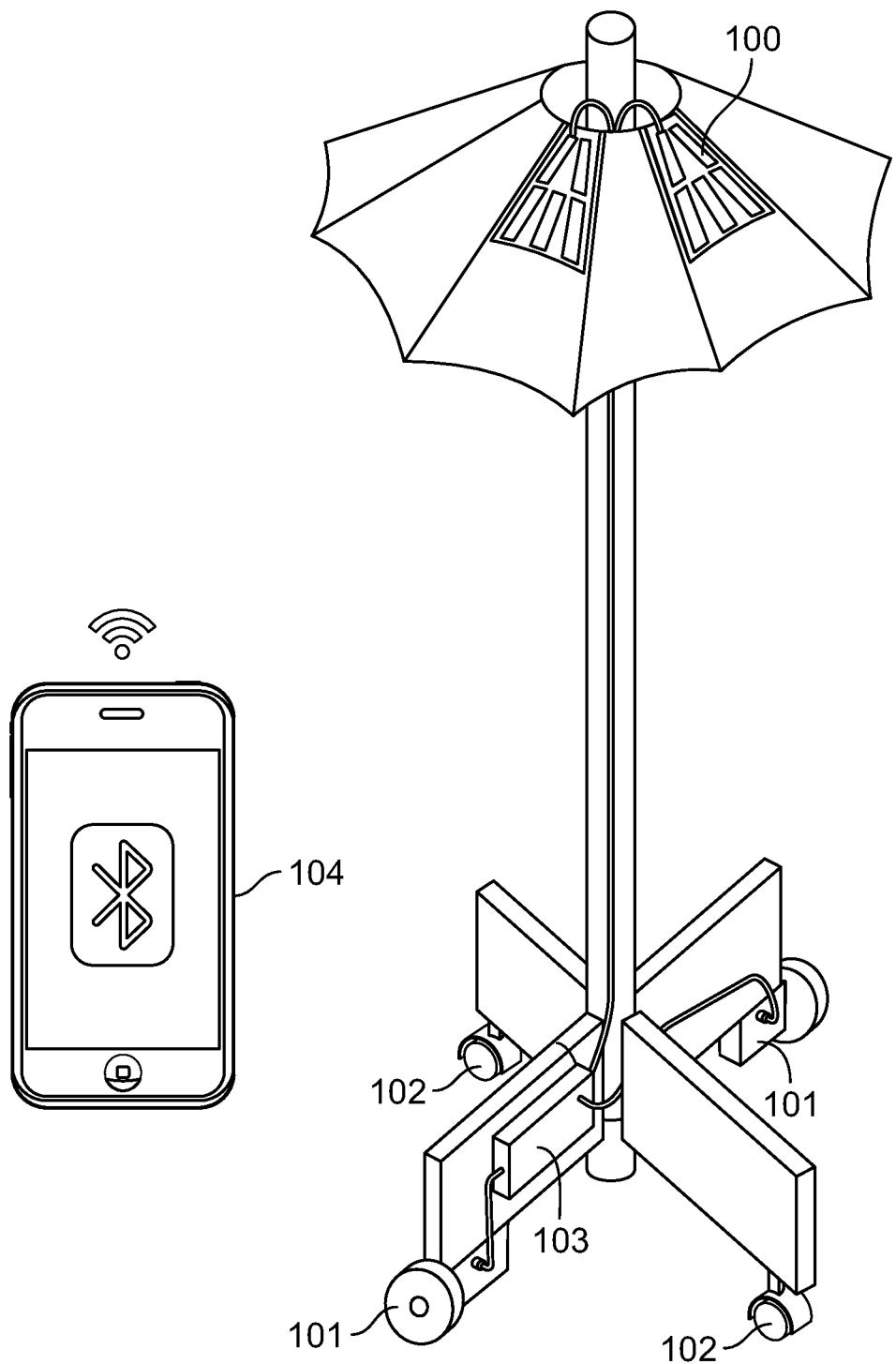
FIG. 1 depicts an umbrella and a base.

The structure of the umbrella base is as depicted in FIG. 1, intersecting rectangular tube steel with a tube in the center to hold the physical umbrella. In the drawing, reference number 101 shows the two drive motors which are placed on opposite sides of the structure, allowing the stand to rotate directly around its center. The drive motors each include a drive wheel that protrudes out from the bottom of the umbrella base to contact the floor. The two drive wheels serve to move the umbrella base. Reference number 102 shows caster wheels on the other two ends of the structure, allowing the base to remain balanced and level (preventing the umbrella base from tipping to one side). The caster wheels are completely free spinning. Towards the bottom of the stand there is a wireless control unit 103 and batteries to power the electronics. The batteries are connected to and charged via solar cells (100) located either on top of the umbrella itself, or alternatively above the surface/top of the base. The control unit is connected to and controls the two drive motors. The control unit is wirelessly connected to by a smartphone application of smartphone 104 using Bluetooth Low Energy (BLE).

The proposed structure is a heavy solar powered motorized patio umbrella base that will allow the user to drive their patio umbrella to a desired location using their smartphone, and then automatically re-position the umbrella as the sun moves. The base is powered by rechargeable batteries powered by a small solar panel. The base drives with two reversible gear motors on opposite sides of the structure, therefor allowing the base to rotate about its center. On the remaining two sides of the structure, the base has caster wheels allowing it to move in any direction. The base has a cylindrical shape allowing different ballast options such as a table, a cooler, or a planter box. The present disclosure connects to the user's smartphone via BLE (Bluetooth low energy) and allows the user to simply drive it around from their smartphone. When the app is launched on the smartphone, the user has to select the device that they want to connect to (in case they have multiple stands) and pair to it. After the phone pairs, the user can drive around the stand via buttons on the app. When one of the buttons is pressed in the app, a command is sent to the controller which causes the drive motors to activate in order to drive the base. The app will access databases via the Internet to determine the exact location of the sun at any given time. The app will request access for the user's location (determined by the smart phone via GPS or other technology), and that information will allow the app to calculate the exact direction of the sun to the user at any given time. Since the app can know where the sun is, that allows the app to drive the base without the user doing anything in order to keep the user in the shade at all times. The app uses location to determine the angle of the sun and positions the umbrella base between the sun and the smartphone and therefore, the user.

Figure 2:
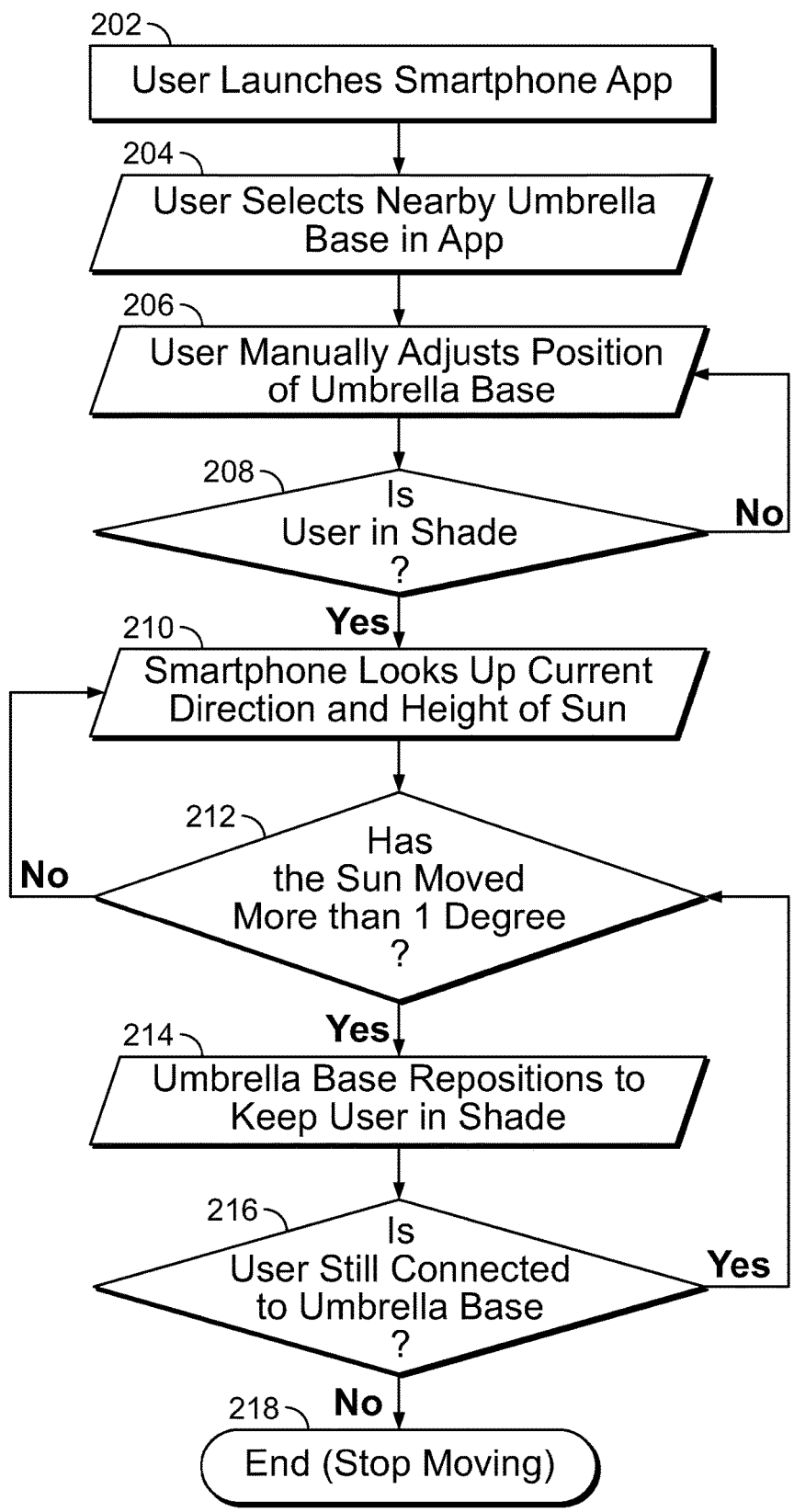
FIG. 2 is a flow chart describing one embodiment of a process for operating the base.

As shown in the flowchart of FIG. 2, a person wishing to use this umbrella, first connects wirelessly using smartphone app to the base, and using remote control buttons in the app, positions the umbrella so that they are in the shade. Subsequently, the base will be able to move it self automatically to keep the user in the shade by determining (through the smartphone), the location of the user, and umbrella, and computing the angle and direction of the sun from this information. The umbrella base will then move itself automatically to keep the user in the shade. If the user repositions themself, they can again always use the manual controls to position the umbrella to give them optimal shade, and the umbrella base will continue to keep them in the shade afterwards.

In step 202, the user launches the smartphone application (app). In step 204, the user selects a nearby umbrella base in the app. In step 206, the user manually adjusts the position of the base by using the app to control the base. Until the user is in the shade (see step 208), the user will continue to manually adjust the position of the umbrella base (step 206). Once the user is in the shade (step 208), the app and base transition into automatic mode. In step 210 the smartphone app looks up the current position (including height) of the sun, calculates the direction of the sun to the user. The app accesses or determines the position of the user (e.g., the position of the smartphone). In one embodiment, step 210 includes automatically determining a position of a user, automatically determining direction of sun to the user, and automatically determining a location for the umbrella base to be located for an umbrella mounted to the umbrella base to shade the user.

If the sun has not moved more than 1 degree (step 212), then the app will loop back to step 210 and recalculate the position and direction of the sun. If the sun has moved more than one degree, the app instructs the base to move the base to the calculated location for the umbrella base to be located for an umbrella mounted to the umbrella base to shade the user in step 214. In step 216, it is determined whether the user is still connected to the umbrella base (via the smartphone and the app). If yes, the process loops back to step 212. If not, then the base stops moving (step 218). Steps 210, 212, 214, and 216 are performed automatically by the umbrella base at the control of the smartphone app.

The present disclosure allows the user to effortlessly position their umbrella, and the shaded area that comes with it, exactly where they want it to be without having to go through the hassle of attempting to lift a weighted umbrella base. This base will be able to be quite heavy and therefore won't have the issue of being blown over by the wind.

One embodiment includes a process for positioning an automated umbrella base, comprising: automatically determining a position of a user; automatically determining a direction of the sun to the user; automatically determining a location for the umbrella base to be located for an umbrella mounted to the umbrella base to shade the user; and automatically moving the umbrella base to the location.

One embodiment includes an automated umbrella base, comprising: a mobile application; wheels; a motor connected to the wheel; a controller connected to the motor, the controller configured to wirelessly communicate with the mobile application; a battery connected to the controller; and a solar panel connected to an providing a power source to the battery.

One embodiment includes an automated umbrella base, comprising: means for moving the umbrella base; a motor connected to the means for moving the umbrella base; a controller connected to the motor, the controller configured to wirelessly communicate to a smartphone application; and a solar panel mounted on the umbrella base and configured to provide a source of power for the controller.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A process for positioning an automated umbrella base, comprising:
   automatically determining a position of a user;
   automatically determining a direction of the sun to the user;
   automatically determining a location for the umbrella base to be located for an umbrella mounted to the umbrella base to shade the user; and
   automatically moving the umbrella base to the location.

2. The process of claim 1, further comprising:
   moving the umbrella base automatically to keep the user in the shade of the umbrella while the sun moves over time.

3. The process of claim 1, further comprising:
   powering the umbrella base using solar power.

4. The process of claim 1, further comprising:
   manually adjusting the position of the umbrella base using an application on a smartphone.

5. The process of claim 1, wherein:
   the automatically determining a location for the umbrella base to be located for an umbrella mounted to the umbrella base to shade the user comprises determining whether the sun has moved more than 1 degree; and
   the automatically moving the umbrella base to the location is performed in response to determining whether that the sun has moved more than 1 degree.

6. The process of claim 1, wherein:
   the automatically determining a position of a user comprises determining a position of a smartphone.

7. The process of claim 6, further comprising:
   determining that the smartphone is no longer connected to the umbrella base; and
   ceasing moving the umbrella base in response to determining that the smartphone is no longer connected to the umbrella base.

8. The process of claim 1, further comprising:
   moving the umbrella base automatically to keep the user in the shade of the umbrella while the sun moves over time; and
   powering the umbrella base using solar power;
   wherein the automatically determining a location for the umbrella base to be located for an umbrella mounted to the umbrella base to shade the user comprises determining whether the sun has moved more than 1 degree, the automatically moving the umbrella base to the location is performed in response to determining whether that the sun has moved more than 1 degree, the automatically determining a position of a user comprises determining a position of a smartphone.

9. An automated umbrella base, comprising:
   a mobile application;
   wheels;
   a motor connected to the wheel;
   a controller connected to the motor, the controller configured to wirelessly communicate with the mobile application;
   a battery connected to the controller; and
   a solar panel connected to and providing a power source to the battery.

10. The automated umbrella base of claim 9, wherein:
    the controller receives a command from the mobile application to move the umbrella base.

11. The automated umbrella base of claim 9, wherein:
    the mobile application is configured to automatically determine a position of a mobile device running the mobile application.

12. The automated umbrella base of claim 9, wherein:
the mobile application is configured to automatically determine a position of the sun.

13. The automated umbrella base of claim 9, wherein:
the mobile application is configured to automatically determine a direction of the sun to a user.

14. The automated umbrella base of claim 9, wherein:
the mobile application is configured to
automatically determine a location for the umbrella base to be located for an umbrella mounted to the umbrella base to shade a user and
send commands to the controller to move the umbrella base to the location; and
the controller controls the motor to move the wheels to automatically position the umbrella base at the location in response to the mobile application.

15. The automated umbrella base of claim 9, wherein:
the mobile application is configured to automatically determine a position of a mobile device running the mobile application;
the mobile application is configured to automatically determine a position of the sun;
the mobile application is configured to automatically determine a direction of the sun to a user;
the mobile application is configured to automatically determine a location for the umbrella base to be located for an umbrella mounted to the umbrella base to shade the user and send commands to the controller to move the umbrella base to the location; and
the controller controls the motor to move the wheels to automatically position the umbrella base at the location in response to the mobile application.

16. The automated umbrella base of claim 9, wherein:
the mobile application and controller are configured to automatically move the umbrella base to keep a user in the shade of the umbrella while the sun moves over time.

17. The automated umbrella base of claim 9, wherein:
the mobile application communicates with the controller via Bluetooth.

18. An automated umbrella base, comprising:
means for moving the umbrella base;
a motor connected to the means for moving the umbrella base;
a controller connected to the motor, the controller configured to wirelessly communicate to a smartphone application; and
a solar panel mounted on the umbrella base and configured to provide a source of power for the controller.

19. The automated umbrella base of claim 18, further comprising:
a battery connected to the controller, the solar panel is configured to provide the source of power for the controller by recharging the battery.

20. The automated umbrella base of claim 18, wherein:
the means for moving the umbrella base includes wheels.

* * * * *